Dec. 23, 1941.  A. G. HAGSTROM  2,267,332
DIRECT READING POSITIVE MEASURING MICROMETER GAUGE
Filed Dec. 9, 1940
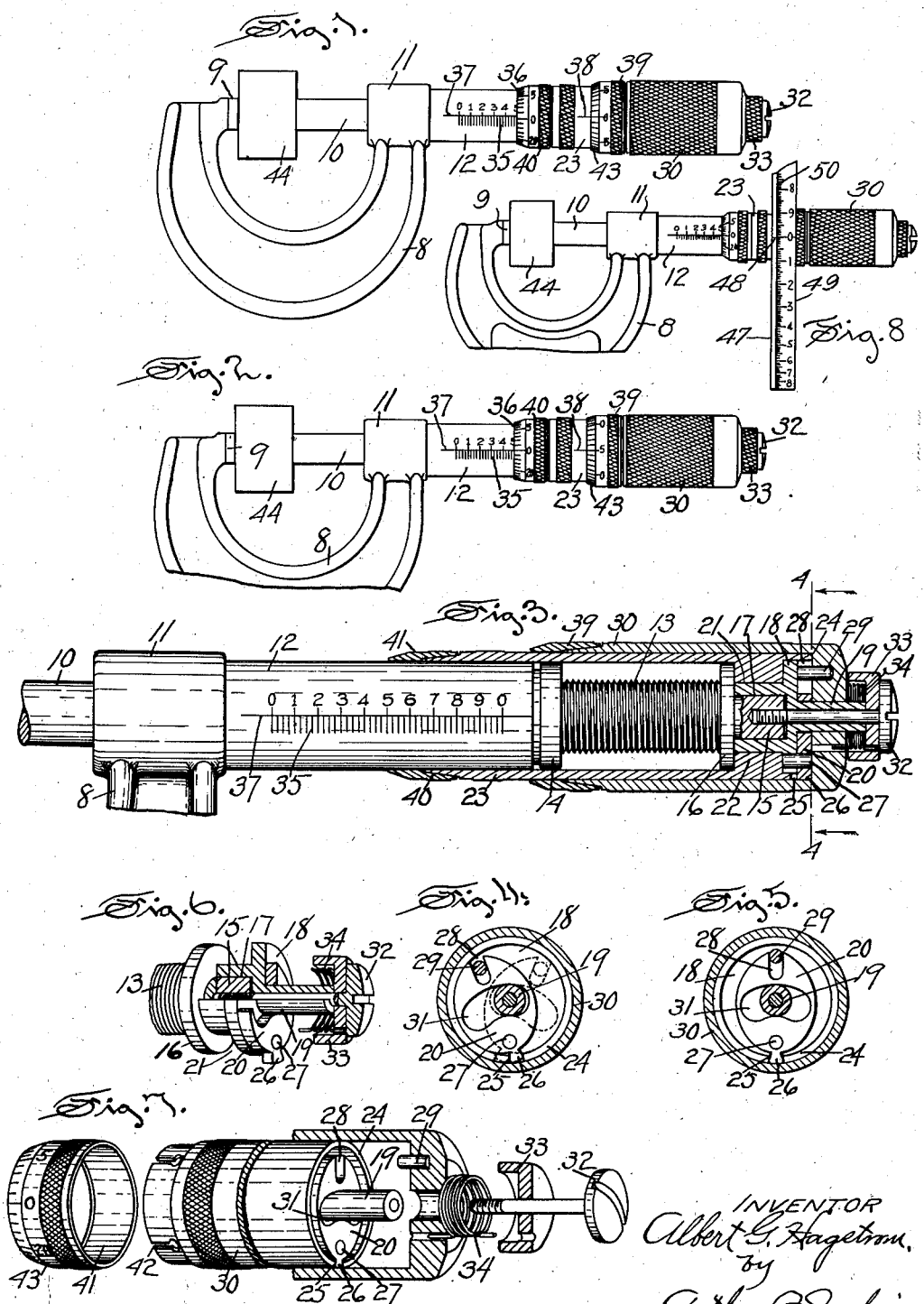

Patented Dec. 23, 1941

2,267,332

UNITED STATES PATENT OFFICE 2,267,332

DIRECT READING POSITIVE MEASURING MICROMETER GAUGE

Albert G. Hagstrom, West Hartford, Conn.

Application December 9, 1940, Serial No. 369,179

14 Claims. (Cl. 33—164)

My invention relates to that class of instruments for effecting delicate and accurate measurements, particularly as to depth and length or other dimensions of an article, and an object of the invention, among others, is the production of an instrument of the type herein mentioned, by means of which measurements to an extremely fine degree may be attained in a most accurate and expeditious manner.

One form of gauge embodying my invention and in the construction and use of which the objects herein set out, as well as others, may be attained, is illustrated in the accompanying drawing, in which—

Figure 1 is a view of my improved gauge illustrating the manner of measuring the thickness of an object.

Figure 2 is a view similar to Figure 1 and illustrating the manner of use of the instrument in connection with Figure 1.

Figure 3 is a view on enlarged scale in axial section through the sleeves of the gauge.

Figure 4 is a view in section on a plane denoted by the broken line 4—4 of Figure 3 with the parts in position as in Figure 2.

Figure 5 is a similar view on the same plane but illustrating the parts in the position shown in Figure 1.

Figure 6 is a perspective view partly in section illustrating the parts immediately connected with and carried by the spindle.

Figure 7 is a similar view including other parts, some of which are disconnected but in their relative positions for assembly.

Figure 8 is a detail view showing a modification of the device.

In the accompanying drawing the numeral 8 denotes the bow shaped frame of my improved gauge, which shape is common to gauges of this type, and which has an anvil 9 at one end of the frame oppositely disposed to a spindle 10 movably mounted in a support 11 located at the other end of the frame, and in a manner to be hereinafter described. Said support has a barrel 12 through which the spindle 10 extends, said spindle having a threaded portion 13 fitting the threaded interior of an adjusting member 14 threaded into the barrel 12 in a manner common to prior structures, all of the parts thus far described being of old and well known construction, and, therefore, a more detailed showing and extended description are omitted herein.

A tip 15 is formed on the end of the spindle with a flange 16 rigid on the spindle at the base of the tip, the latter extending into a recess 17 formed in one side of a flanged sub-spindle 18. A tubular neck 19 extends from said sub-spindle opposite the recess 17 and a multiplying lever 20 is pivotally mounted on a flange on said sub-spindle, as shown in Figure 3 of the drawing. An annular recess 21 is formed between the flange 16 and a flange on the sub-spindle 18, and an integrally formed annular support 22 on a measuring sleeve 23 is located in said recess. A flange 24 extends longitudinally from the end of the sleeve 23 and has a notch 25 to receive a finger 26 projecting from the multiplying lever 20, as shown in Figure 5. Said lever is pivotally mounted on a pin 27 secured in and projecting from the sub-spindle flange 18, said lever having a notch 28 to receive a pin 29 projecting from the inner surface of the end of a finer measuring sleeve 30.

The sleeve 23, which I term herein a coarser measuring sleeve to distinguish it from the finer measuring sleeve 30 which provides for comparatively fine adjustment, is rotatably supported on the flange 16 and also on the barrel 12 as well as the sub-spindle 18, and the finer measuring sleeve 30 is rotatably mounted on the coarser measuring sleeve, as shown in Figure 3. The multiplying lever 20 has an arcuate opening 31 through which the neck 19 extends, this opening permitting swinging movement of the lever 20 on its pivot 27 in a manner presently to be described.

A headed retaining screw 32 is threaded into the tip 15, the head of the screw being seated against a tensioning cap 33 for a sleeve return spring 34, the cap being seated against the end of the neck 19 and the spring acting as a resilient connection between the measuring sleeve 30 and the cap 33 which is rigidly connected with the spindle 10 by means of the screw 32 which draws the spindle tightly against the sub-spindle 18 and the latter tightly against the cap, the effect being to cause the spring 34 to act as a resilient connection between the sleeve 30 and the spindle. This spring is coiled several times around the neck 19, one end of the spring being bent to enter a hole in the cap and the opposite end of the spring being bent to enter a hole in the sleeve 30, as shown in Figure 3.

The barrel 12 is provided with graduations 35 which are numbered from one to ten and these are sub-divided into four spaces each of which denotes a twenty-five thousandth of an inch. The sleeve 23 has a graduated scale 36 extending around it and divided into twenty-five spaces, and these are sub-divided into spaces each representing one twenty-fifth of the distance around the sleeve. The scale 35 has an index mark 37, and a turn of the sleeve from zero to the first graduation mark thereon represents one one-thousandth (.001) of an inch, that is, the end of the spindle will be moved from the anvil the distance of one one-thousandth (.001) of an inch and a full turn of the sleeve represents twenty-five one-thousandths (.025) of an inch, moving the sleeve along the scale 35 a distance of one graduation thereof and denoting a movement of the end of the spindle from the anvil a distance of twenty-five one-thousandth (.025) of an inch. All of the parts thus far described and the operation thereof are common and well known to those skilled in the art and will, therefore, be readily understood.

The sleeve 30 bearing the scale 43 and its construction and operation, however, comprises an important element of my invention. This sleeve is graduated to denote rotation of the sleeve to measure ten-thousandths (.0001) of inches, that is rotation of this sleeve a space of one graduation as denoted by the index mark 38 on the sleeve 23 will show a movement of the end of the spindle from the anvil a distance of one ten-thousandth (.0001) part of an inch.

In order to adjust the position of the finer measuring sleeve 30 whenever it may have been disarranged from any cause, an adjusting band 39 is adjustably rotatable on the sleeve and is frictionally mounted and retained in its correct position on the sleeve, this correct position being denoted by registration of the index mark 38 with the zero graduation on the sleeve, and in order to facilitate operation of the sleeve the graduations are divided into four sections, each section extending ninety degrees around the sleeve so that measurements may be seen with the instrument in any one of the four positions, thereby avoiding the necessity of turning the instrument to observe a measurement, which turning would be liable to disarrange the position of the sleeve.

The sleeve 23 is provided with similar means for adjusting it to correct position by means of a band 40 frictionally retained in position with its zero mark registering with the line 37. The bands may be frictionally held by means of the tapered end of a sleeve entering a tapered recess 41 in the band, as shown in Figure 3 of the drawing, or the sleeve may be split, as shown at 42 in Figure 7 to provide the frictional retaining means. These tapered contact surfaces, as is common in the construction of frictional engaging holding surfaces, are of such character that while they may be turned by the application of a little force, yet, they will not readily loosen but will retain such adhering qualities that they will not be inadvertently disengaged, as shown in the drawing herein these tapered surfaces being arranged at angles less than seven and one-half degrees which is sufficient for my purpose, the taper herein shown being substantially two and one-half degrees. While this adjusting feature is of particular value when used with my improved device, I contemplate that it may be applied to many of the various kinds of threaded measuring implements, particularly of the sleeve type.

The spring 34 is sufficiently strong to normally hold the multiplying lever 20 against the inner surface of the flange 24 on the sleeve 23 in the position shown in Figure 4 and to retain it in this position whenever force is applied to turn the sleeves, so long as no resistance is offered to lengthwise movement of the spindle 10. The least resistance, however, to such movement of the spindle will cause the spring to yield and permit rotation of the sleeve 30 at a faster rate than that of rotation of the sleeve 23.

In the operation of the device force is initially applied to turn the sleeve 30 and, as will be seen, the construction is such that at this time all of the parts, with the exception of the frame including the barrel 12, will turn in unison and at the same rate. The instant, however, that the spindle 10 encounters resistance, as by a piece of work 44, as shown in Figures 1 and 2, it being observed that at this instant the zero marks on the sleeves 30 and 23 will register respectively with the lines 38 and 37, as shown in Figure 2, the sleeve 30 will begin to turn faster than the sleeve 23 and at a rate ten times faster. This is effected by a yielding of the spring 34, which, up to this time, holds the sleeve 30 and multiplying lever 20 in the positions shown in Figure 4. This yielding of the spring causes the force applied to the sleeve 30 to exert its influence on the multiplying lever through the medium of the pin 29, and the ratio of distance between the pivot 27 and the connection between the finger 26 and the flange 24 on the sleeve 23 and the distance from said pivot to the connection of the pin 29 to the connector are such as to effect an increased ten-fold turning movement of the sleeve 30 over the sleeve 23 hereinbefore referred to, the multiplying lever, during this operation, moving to the right from the position shown in Figure 4 toward the position shown in Figure 5 and beyond such position, should circumstances so require, until the multiplying lever makes contact with the opposite side of the flange 24 from that shown in Figure 4.

As an example of the operation, noting Figure 1, the parts are shown in the position with the spindle 10 in contact with the work piece 44 at the instant the spindle touches such piece by turning movement of the sleeve 30, all of the parts up to this point turning in unison at the same rate and the measurement, as denoted by the instrument, now having been effected. It is now to be determined what this measurement is.

The sleeve 23 having been rotated to the right, together with the sleeve 30 to which force was applied, it is seen that the zero mark on the sleeve 23 has not quite reached the line 37, consequently the five-hundred-thousandths (.500) mark has not been reached and the measurement is, therefore, something over five-hundred-thousandths (.500), that is it is .500 plus. From this point resistance by the work piece to movement of the plunger now takes place and as a consequence rotation of the sleeve 30 being continued the spring 34 yields causing movement of the multiplying lever 20 to the right from the position shown in Figure 4, effecting movement of the sleeve 23 in the same direction but at a rate ten times slower than that of the sleeve 30. Rotation of the sleeve 30 is continued until the zero mark on the sleeve 23 registers with the mark 37 on the barrel 12. From the point just mentioned at which the spindle contacted with the work piece and the sleeve 30 commenced to move ten times faster than the sleeve 23 it is seen by reference to Figure 2 that the sleeve 30 has moved a distance of five graduation marks from the zero registration shown in Figure 1, that is the sleeve 30 has moved five-ten-thousandths of an inch, consequently the reading of the measurement of the thickness of the work piece is .5005.

In order to secure the greatest efficiency of spring action between the sleeve 30 and the spindle through the medium of the cap 33, the spring 34 is provided with a number of coils, four being shown herein as I have found four or five coils to be sufficient for all practical purposes. However, as many more coils as may be desired may be used, generally speaking, the more that are used the more delicately will the gauge function. The tension of the spring is adjusted by means of the cap 33 which is secured from turning after adjustment by the screw 32.

It will be noted that the measurements obtained by the gauge are positive and any measurements obtained may be read directly by simply noting the position of the two sleeves 23 and 30 with respect to the graduations in connection with which they operate, and this reading may be obtained with the instrument in any one of four different positions without the necessity of turning it to observe the measurements.

In that form of the device shown in Fig. 8 I have made provision for readily ascertaining measurements in hundred-thousandths of inches. The device in all material respects is the same as that shown and described with respect to the preceding figures of the drawing. The scale 43 on the sleeve 30 might be employed to determine measurements as fine as hundredths of thousandths of inches if space would permit, but graduations denoting such measurements would be invisible to the naked eye. I have therefore provided the device as shown in Fig. 8 with space enough for the display of graduation marks denoting such measurements. This device is particularly convenient for use as a bench measuring instrument in which the frame 8 may be secured in a bench clamp or vise 45 mounted in any suitable manner on a bench. A supporting disk 47 with an index mark 48 thereon is secured to the sleeve 23 and a disk 49 with a graduated scale 50 thereon is secured to the sleeve 30. This scale 50 compares with the scale 43 in the device of the other figures except that the unnumbered graduation marks of the scale 50 represent measurements in hundredths of thousandths of inches, as compared with measurements in tens of thousandths of inches in the devices of the other figures and the numbered graduation marks of the scale 50 represent measurements in ten-thousandths of inches. As an example, a turning of the disk 49 a distance between the first two graduation marks beginning at zero represents a measurement of .00001 and a turning of said disk from the zero mark to the graduation numbered 1 represents a measurement of .00010.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. A micrometer gauge comprising a frame and including a threaded spindle, an anvil in cooperative relation with the spindle, a barrel in which the spindle is contained, a plurality of measuring sleeves rotatably mounted upon the barrel and upon one another, a connection between said sleeves for multiplying the rate of rotation of one relatively to another, a yielding connection between one of said sleeves and said spindle for operation of the latter, and means on said barrel and sleeves for denoting the amount of movement of said sleeves.

2. A micrometer gauge comprising a frame and including a threaded spindle, an anvil in cooperative relation with the spindle and a barrel in which the spindle is contained, a plurality of measuring sleeves rotatably mounted upon the barrel and upon one another, a connection between said sleeves for multiplying the rate of rotation of one relatively to another, a yielding spring connection between one of said sleeves and said spindle for operation of the latter, and means on said barrel and sleeves for denoting the amount of movement of said sleeves.

3. A micrometer gauge comprising a frame and including a threaded spindle, an anvil in cooperative relation with the spindle and a barrel in which the spindle is contained, a plurality of measuring sleeves rotatably mounted upon the barrel and upon one another, a connection between said sleeves for multiplying the rate of rotation of one relatively to another, a yielding connection between one of said sleeves and said spindle, said connection including a spring having a plurality of coils, and means on said barrel and sleeves for denoting the amount of movement of said sleeves.

4. A micrometer gauge comprising a frame and including a threaded spindle, an anvil in cooperative relation with the spindle and a barrel in which the spindle is contained, a plurality of measuring sleeves rotatably mounted upon the barrel and upon one another, a connection between said sleeves for multiplying the rate of rotation of one relatively to another, a yielding connection between one of said sleeves and the spindle for imparting rotation to the latter, means operative as a result of said rotation for imparting lengthwise movement to said spindle, and means on said barrel and sleeves for denoting the amount of movement of said sleeves.

5. A micrometer gauge comprising a frame and including a threaded spindle, an anvil in cooperative relation with the spindle and a barrel within which the spindle is threadedly engaged, a plurality of measuring sleeves rotatably mounted upon the barrel and upon one another, a connection between said sleeves for multiplying the rate of rotation of one relatively to another, a connection between one of said sleeves and said spindle for rotation of the latter by the former, said connection being yieldingly traveling to permit rotation of the sleeve independently of the spindle, and means on said barrel and sleeves for denoting the amount of movement of said sleeves.

6. A micrometer gauge comprising a frame and including a threaded spindle, an anvil in cooperative relation with the spindle and a barrel in which the spindle is contained, a plurality of measuring sleeves rotatably mounted upon the barrel and upon one another, a connection between said sleeves for multiplying the rate of rotation of one relatively to another, a connection between one of said sleeves and said spindle for rotation of the latter by the former, said connection including means to permit rotation of the sleeve independently of the spindle, and means upon said barrel and sleeves for denoting the amount of movement of said sleeves.

7. A micrometer gauge comprising a frame and including a threaded spindle, an anvil in cooperative relation with the spindle and a barrel in which the spindle is contained, a multiplying lever support rotatably mounted within the sleeves and having a recess into which said spindle extends, means for clamping the support to the spindle, a connection between said sleeves for multiplying the rate of rotation of one relatively to another, said connection including a multiplying lever pivotally mounted on said support and engaged at its opposite ends with said sleeves, a yielding connection between one of said sleeves and said support to permit rotation of said sleeves independently of the support, and means upon said barrel and sleeves for denoting the amount of movement of said sleeves.

8. A micrometer gauge comprising a frame and including a threaded spindle, an anvil in cooperative relation with the spindle and a barrel in which the spindle is contained, a multiplying lever support rotatably mounted within the sleeves and having a recess into which said spindle extends, means for clamping the support to said spindle, a connection between the sleeves for multiplying the rate of rotation of one relatively to another, said connection including a multiplying lever pivotally mounted on said support and engaged at one end close to said pivot with said sleeve and at its opposite end at a greater distance from said pivot with the other of said sleeves, and means on said barrel and sleeves for denoting the amount of movement of said sleeves.

9. A micrometer gauge comprising a frame and including a threaded spindle, an anvil in cooperative relation with the spindle and a barrel in which the spindle is contained, a plurality of measuring sleeves rotatably mounted upon the barrel and upon one another, a multiplying lever support rotatably mounted within the sleeves, a spring tensioning cap adjustably rotatably secured to said support, a connection between said sleeves including a multiplying lever pivotally mounted on said support for multiplying the rate of rotation of one sleeve relatively to another, a yielding connection between said sleeves including a spring secured at its opposite ends to one of said sleeves and to said tensioning cap, and means on said barrel and sleeves for denoting the amount of movement of said sleeves.

10. A micrometer gauge comprising a frame and including a threaded spindle, an anvil in cooperative relation with the spindle, a barrel in which the spindle is contained, a plurality of measuring sleeves rotatably mounted upon the barrel and upon one another, a connection between said sleeves for multiplying the rate of rotation of one relatively to another, a yielding connection between one of said sleeves and said spindle for operation of the latter, and means on one of said sleeves for denoting measurements in hundredths of thousandths (.00001) of inches.

11. A micrometer gauge comprising a frame and including a threaded spindle, an anvil in cooperative relation with the spindle, a barrel in which the spindle is contained, a plurality of measuring sleeves rotatably mounted upon the barrel and upon one another, a connection between said sleeves for multiplying the rate of rotation of one relatively to another, a yielding connection between one of said sleeves and said spindle for operation of the latter, a disk of large diameter as compared with said last mentioned sleeve secured to said sleeve and having a graduated scale, and means cooperating with said scale to determine its degree of rotation.

12. A micrometer gauge comprising a frame and including a threaded spindle, an anvil in cooperative relation with the spindle, a barrel in which the spindle is contained, a plurality of measuring sleeves rotatably mounted upon the barrel and upon one another, a connection between said sleeves for multiplying the rate of rotation of one relatively to another in amounts increasing in ten-fold ratios, and a yielding connection between one of said sleeves and said spindle for operation of the latter.

13. A micrometer gauge comprising a frame and including a threaded spindle, an anvil in cooperative relation with the spindle and a barrel in which the spindle is contained, a plurality of measuring sleeves rotatable upon the barrel and upon one another, a connection between said sleeves for multiplying the rate of rotation of one relatively to another, a connection between said sleeves and said spindle for rotation of the latter by the former, said connection including means to permit rotation of the both of said sleeves independently of the spindle, and means upon said barrel and sleeve for denoting the amount of movement of said sleeves.

14. A micrometer gauge comprising a frame and including a threaded spindle, an anvil in cooperative relation with the spindle and a barrel in which the spindle is contained, a plurality of measuring sleeves rotatable upon the barrel and upon one another, a connection between said sleeves for multiplying the rate of rotation of one relatively to another, a connection between said sleeves and said spindle for rotation of the latter by the former, said connection including means to permit rotation of either of said sleeves independently of the spindle, and means upon said barrel and sleeve for denoting the amount of movement of said sleeves.

ALBERT G. HAGSTROM.